(12) United States Patent
Lewis et al.

(10) Patent No.: US 10,452,392 B1
(45) Date of Patent: Oct. 22, 2019

(54) CONFIGURING PROGRAMMABLE INTEGRATED CIRCUIT DEVICE RESOURCES AS PROCESSORS

(71) Applicant: Altera Corporation, San Jose, CA (US)

(72) Inventors: David Lewis, Toronto (CA); Valavan Manohararajah, Scarborough (CA)

(73) Assignee: Altera Corporation, San Jose, CA (US)

( * ) Notice: Subject to any disclaimer, the term of this patent is extended or adjusted under 35 U.S.C. 154(b) by 734 days.

(21) Appl. No.: 14/600,322

(22) Filed: Jan. 20, 2015

(51) Int. Cl.
*G06F 9/30* (2018.01)

(52) U.S. Cl.
CPC ........ *G06F 9/3001* (2013.01); *G06F 9/30145* (2013.01)

(58) Field of Classification Search
CPC .... G06F 9/3885; G06F 9/3887; G06F 9/3889; G06F 15/17343; G06F 15/17381; G06F 15/8007; G06F 15/17337; G06F 7/483; G06F 9/30145; G06F 15/8015; G06F 15/803; G06F 9/3851; G06F 9/30036; G06F 9/3834; G06F 15/17368; G06F 9/30189; G06F 9/3891; G06F 9/3802; G06F 9/3836; G06F 9/3838; G06F 9/30
See application file for complete search history.

(56) References Cited

U.S. PATENT DOCUMENTS 3,473,160 A 10/1969 Wahlstrom
4,871,930 A 10/1989 Wong et al.
(Continued)

FOREIGN PATENT DOCUMENTS

EP 0 419 105 3/1991
EP 0 461 798 12/1991
(Continued)

OTHER PUBLICATIONS

Case et al., "Design Methodologies for Core-Based FPGA Designs", Apr. 9, 1997, pp. 1-12.
(Continued)

*Primary Examiner* — Seokjin Kim
(74) *Attorney, Agent, or Firm* — Fletcher Yoder, P.C.

(57) ABSTRACT

A programmable integrated circuit device includes a plurality of clusters of programmable logic resources. Programmable device interconnect resources allow user-defined interconnection between the clusters of programmable logic resources. A plurality of specialized processing blocks have dedicated arithmetic operators and programmable internal interconnect resources, and having inputs and outputs programmably connectable to the programmable device interconnect resources. A plurality of embedded memory modules have inputs and outputs programmably connectable to the programmable device interconnect resources. Instruction sequencing circuitry is provided, and the instruction sequencing circuitry, at least one of the specialized processing blocks and at least one of the embedded memory modules, are programmably connectable to form a processor, where the memory module serves as instruction memory. Optionally, a dedicated instruction bus communicates the instructions from the embedded memory module or modules to the specialized processing block or blocks.

25 Claims, 9 Drawing Sheets

(56) References Cited

U.S. PATENT DOCUMENTS

| | | | |
|---|---|---|---|
| 5,122,685 | A | 6/1992 | Chan et al. |
| 5,128,559 | A | 7/1992 | Steele |
| 5,371,422 | A | 12/1994 | Patel et al. |
| 5,483,178 | A | 1/1996 | Costello et al. |
| 5,581,696 | A | 12/1996 | Kolawa et al. |
| 5,689,195 | A | 11/1997 | Cliff et al. |
| 5,724,583 | A | 3/1998 | Carmon et al. |
| 5,754,459 | A | 5/1998 | Telikepalli |
| 5,825,202 | A | 10/1998 | Tavana et al. |
| 5,874,834 | A | 2/1999 | New |
| 5,970,254 | A | 10/1999 | Cooke et al. |
| 6,052,773 | A | 4/2000 | DeHon et al. |
| 6,069,487 | A | 5/2000 | Lane et al. |
| 6,075,935 | A | 6/2000 | Ussery et al. |
| 6,091,262 | A | 7/2000 | New |
| 6,094,065 | A | 7/2000 | Tavana et al. |
| 6,211,697 | B1 | 4/2001 | Lien et al. |
| 6,215,326 | B1 | 4/2001 | Jefferson et al. |
| 6,346,824 | B1 | 2/2002 | New |
| 6,407,576 | B1 | 6/2002 | Ngai et al. |
| 6,457,116 | B1 | 9/2002 | Mirsky et al. |
| 6,467,009 | B1 | 10/2002 | Winegarden et al. |
| 6,519,753 | B1 | 2/2003 | Ang et al. |
| 6,538,470 | B1 | 3/2003 | Langhammer et al. |
| 6,556,044 | B2 | 4/2003 | Langhammer et al. |
| 6,573,749 | B2 | 6/2003 | New et al. |
| 6,588,008 | B1 | 7/2003 | Heddes et al. |
| 6,628,140 | B2 | 9/2003 | Langhammer et al. |
| 6,745,369 | B1 | 6/2004 | May et al. |
| 6,803,785 | B1 | 10/2004 | May et al. |
| 7,315,918 | B1 * | 1/2008 | Yin .................. G06F 15/7857 711/104 |
| 7,859,302 | B2 | 12/2010 | Balasubramanian et al. |
| 8,539,011 | B1 | 9/2013 | Taylor |
| 2005/0040850 | A1 * | 2/2005 | Schultz ............ G06F 15/7867 326/41 |
| 2005/0257030 | A1 * | 11/2005 | Langhammer ...... G06F 15/7867 712/226 |

FOREIGN PATENT DOCUMENTS

| | | |
|---|---|---|
| EP | 0 801 351 | 10/1997 |
| GB | 2 283 602 | 5/1995 |
| JP | 02-115957 | 4/1990 |
| JP | 2-157957 | 6/1990 |
| JP | 7-175784 | 7/1995 |
| JP | 8-250685 | 9/1996 |
| JP | 10-049510 | 2/1998 |
| JP | 11-040522 | 2/1999 |
| WO | WO 96/34346 | 10/1996 |
| WO | WO 98/38741 | 9/1998 |
| WO | WO 99/40552 | 8/1999 |
| WO | WO 00/31652 | 6/2000 |
| WO | WO 02/33504 | 4/2002 |

OTHER PUBLICATIONS

"Computer Architecture—A Quantative Approach", Hennessy and Patterson, 1966, pp. 75 and 82.

"Excalibur Backgrounder", Altera, Jun. 2000, ver. 1, pp. 1-10.

"Implementing Logic with the Embedded Array in FLEX 10K Devices", *Altera*, May 2001, ver. 2.1, pp. 1-20.

"Implementing Multipliers in FLEX 10K EABs", *Technical Briefs*, Altera, Mar. 1996, pp. 1-2.

"Microsoft Computer Dictionary", *Microsoft*, 1999, pp. 139 and 290.

Niedermeier, B., "Embedded-Processor Solutions for PLDs, Convergence of Programmable Technologies", *Elektronick*, Sep. 19, 2000, pp. 1-6.

"Processors drive (or dive) into programmable-logic devices" *EDN—Electrical Design News*, Cahners Publishing Co., Jul. 20, 2000, vol. 45, No. 15, pp. 107-108, 110, 112 and 114.

"QuickDSP™ Family Data Sheet", *Quicklogic*, Aug. 7, 2001, revision B, pp. 1-19.

Razdan et al., "A High-Performance Microarchitecture with Hardware-Programmable Functional Units", 1994, pp. 172-180.

"The QuickDSP Design Guide", *Quicklogic*, Aug. 2001, revision B, pp. 1-38.

"Virtex-II 1.5V Field-Programmable Gate Arrays", Xilinx, Apr. 2, 2001, module 1 of 4, pp. 1-7.

"Virtex-II 1.5V Field-Programmable Gate Arrays", *Xilinx*, Apr. 2, 2001, module 2 of 4, pp. 1-36.

"Virtex-II 1.5V Field-Programmable Gate Arrays", *Xilinx*, Jan. 25, 2001, module 2 of 4, pp. 1-50.

Wittig et al., "OneChip: An FPGA Processor with Reconfigurable Logic", *IEEE*, 1996, pp. 126-135.

"Xilinx Announces DSP Algorithms, Tools and Features for Virtex-II Architecture", *Xilinx*, Jun. 27, 2001, pp. 1-7.

"Xilinx Unveils New FPGA Architecture to Enable High-Performance, 10 Million System Gate Designs", *Xilinx*, Jun. 22, 2000, 9 pages.

Xilinx, "The Programmable Logic Data Book", Apr. 1998, pp. 4:5 and 4:18-21.

\* cited by examiner

CONFIGURING PROGRAMMABLE INTEGRATED CIRCUIT DEVICE RESOURCES AS PROCESSORS

FIELD OF THE INVENTION

This invention relates to a programmable integrated circuit device, and particularly to using specialized processing blocks and memory as processing elements in a programmable integrated circuit device.

BACKGROUND OF THE INVENTION

Considering a programmable logic device (PLD) as one example of a programmable integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals (such as by Finite Impulse Response (FIR) filtering). Such blocks are also frequently referred to as multiply-accumulate ("MAC") blocks, because they include structures to perform multiplication operations, and sums and/or accumulations of multiplication results. As used herein and in the claims which follow, a "digital signal processing (DSP) block" is a collection of arithmetic functions units which also may contain some data memory.

For example, PLDs sold by Altera Corporation, of San Jose, Calif., as part of the STRATIX®, ARRIA®, CYCLONE® and HARDCOPY® families include DSP blocks, each of which includes one or more multipliers. Each of those DSP blocks also includes one or more adders and registers, as well as programmable connectors (e.g., multiplexers) that allow the various components of the block to be configured in different ways. In addition, those DSP blocks can be configured for operation at different precisions.

Another type of specialized function that could be performed on a programmable integrated circuit device is that of a processor (e.g., a microprocessor). As used herein and in the claims which follow, a "processor" is a programmable engine that can execute an instruction set.

One known possibility is to configure a processor from general-purpose programmable logic of a programmable integrated circuit device. The configuration of general-purpose programmable logic into a processor may be aided by the availability, from the programmable integrated circuit device manufacturer, or from others, of a "soft processor"—i.e., prerecorded configuration instructions for an efficient configuration of a processor on the programmable integrated circuit device. For example, the aforementioned Altera Corporation provides its customers with a soft processor "core" under the trademark NIOS® II.

Another known possibility is to provide dedicated processor circuitry on a portion of a programmable integrated circuit device. For example, the aforementioned Altera Corporation provides devices that may include dedicated ARM® processors from ARM Ltd., of Cambridge, England.

Both of these approaches may have drawbacks. For example, the soft processor approach consumes a substantial amount of the general-purpose logic resources of a device to instantiate the processor, leaving fewer resources for other user functions without moving to a larger device. On the other hand, while the dedicated processor approach consumes less device area than the soft processor approach, thereby leaving more general-purpose logic resources available on a device of a given size, the dedicated processor still consumes device area that a user, who does not need a processor, might prefer to see used for general-purpose logic resources. Further, some fixed number of dedicated processors would be provided on any particular device, and a user who desires more than that fixed number may not be able to implement additional processors.

SUMMARY OF THE INVENTION

In accordance with embodiments of the present invention, a small amount of additional circuitry may be added to a programmable integrated circuit device to allow specialized processing blocks such as the aforementioned DSP blocks to be combined with other specialized processing blocks such as the aforementioned memory blocks to form small processing elements. This approach consumes a minimum of device area while, for some user designs, avoiding the need to use a large amount of general-purpose logic resources for processor functions, and also avoiding the provision on the device of a dedicated processor that may not be used.

In embodiments of the invention, a programmable integrated circuit device, such as an FPGA, may include embedded memory blocks (e.g., RAM blocks) and DSP blocks. In accordance with embodiments of the invention, an instruction sequencing unit may be provided in association with either the embedded memory blocks or the DSP blocks, which allows embedded memory blocks and DSP blocks to function together as processors. If a user design does not call for processors, the instruction sequencing unit would not be turned on, and the embedded memory blocks and DSP blocks could be used for their "traditional" uses as independent memories and arithmetic operators.

In accordance with other embodiments of the invention, an instruction bus can be provided having a size on the order of one or a few DSP blocks or embedded memory blocks. The instruction bus would include conductors, separate from the general-purpose interconnect of the programmable device, that are dedicated for use as an instruction bus but whose connections to the DSP blocks or embedded memory blocks are programmable.

Therefore, in accordance with embodiments of the present invention there is provided a programmable integrated circuit device having a plurality of clusters of programmable logic resources, and programmable device interconnect resources allowing user-defined interconnection between the clusters of programmable logic resources. There also are a plurality of specialized processing blocks having arithmetic operators and programmable internal interconnect resources, and having inputs and outputs programmably connectable to the programmable device interconnect resources. A plurality of dedicated memory modules have inputs and outputs programmably connectable to the programmable device interconnect resources. The device also includes instruction sequencing circuitry, wherein the instruction sequencing circuitry, at least one of the specialized processing blocks and at least one of the embedded memory modules are programmably connectable to form a processor.

A processor configured on such a device also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

The logic fabric of known programmable integrated circuit devices, such as FPGAs, may include look-up tables (LUTs) and flip-flops (FFs) organized into clusters, arithmetic operators organized into DSP blocks, and embedded memory blocks (e.g., RAMs). This known architecture offers a high degree of programmability. However, this architecture may suffer from a speed penalty, in that it is difficult to implement logic designs on such devices that are able to achieve speeds above 300 MHz. However, the embedded memory blocks and DSP blocks can operate at much higher speeds—even in excess of 600 MHz. The pairing of embedded memory blocks and DSP blocks into processors in accordance with this invention allows those processors to operate to perform computations at the higher rates that can be achieved by the embedded memory blocks and DSP blocks, even though the remainder of the device may operate at a slower rate.

In accordance with aspects of the invention, an instruction sequencing unit is provided onboard the programmable integrated circuit device, to be used when a processor is instantiated from one or more embedded memory blocks and one or more DSP blocks. The instruction sequencing unit would include a program counter and incrementing and branching logic, whose function is controlled by instructions and by data values in the datapath. Although the instruction sequencing unit could be located anywhere on the programmable integrated circuit device (subject to latency concerns), it may be convenient to provide the instruction sequencing unit either within an embedded memory block or within a DSP block.

The specific distribution of instruction sequencing units on the programmable integrated circuit device may be determined by the design of the particular programmable integrated circuit device. For example, an instruction sequencing unit could be provided in every embedded memory block or only a subset of embedded memory blocks, or alternatively in every DSP blocks or only a subset of DSP blocks. As a further alternative, instruction sequencing units could be provided in a subset of embedded memory blocks and a subset of DSP blocks. In such an alternative, it might be expected that the embedded memory blocks in which instruction sequencing units are located would not be adjacent to the DSP blocks in which instruction sequencing units are located, so that the instruction sequencing units are more uniformly distributed throughout the programmable integrated circuit device.

In accordance with other aspects of the invention, a dedicated, programmably connectable, instruction bus may be provided. These dedicated connections, provided solely to allow instructions to flow between an embedded memory block (acting as an instruction memory of a processor) and a DSP block (acting as function units, data memories and data address counters of a processor), may operate at higher speeds than the general-purpose routing of the programmable integrated circuit device, and therefore may further enhance the speed of the resulting processor by helping to realize the potential presented by the higher operating speeds of the embedded memory blocks and DSP blocks. While dedicated to use as an instruction bus, the instruction bus conductors remain programmably connectable (because they will not always be used). Moreover, the dedicated instruction bus allows the instruction memory to be "local" to the computational elements that need it.

Figure 1:
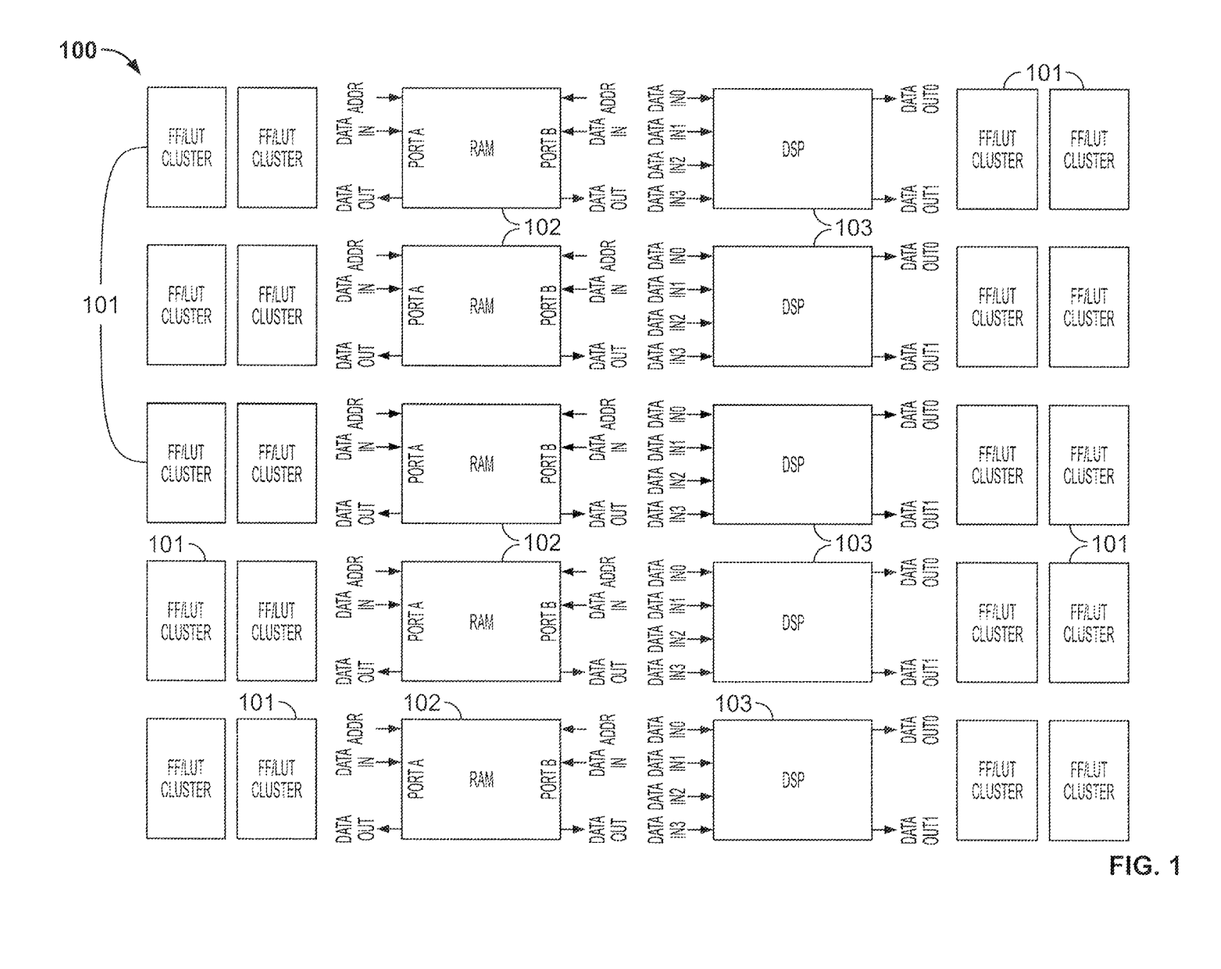
FIG. 1 shows a portion of a known programmable integrated circuit device architecture which can be adapted for use with the present invention.

FIG. 1 illustrates a portion of a known programmable integrated circuit device architecture 100, which can be adapted for use with the present invention. Device architecture 100 includes elements arranged in a conventional rectilinear row-and-column "floorplan," with columns of programmable FF/LUT clusters 101 (or other programmable logic elements) interspersed with columns of embedded memory blocks 102 and columns of DSP blocks 103 (this partial representation shows one column of embedded memory blocks 102 and one column of DSP blocks 103). Although the particular relative placement of embedded memory blocks 102 and DSP blocks 103 may heretofore not have been important, device architecture 100 as shown is particularly well-suited for adaptation in accordance with the present invention, with the embedded memory blocks 102 and DSP blocks 103 arranged in neighboring columns.

As is common in many known programmable integrated circuit devices, such as FPGAs, each embedded memory block 102 may be a single-ported, simple-dual-ported, or true-dual-ported RAM structure. Similarly, each DSP block 103 may take a number of inputs and produce a number of outputs. The embedded memory blocks 102 and DSP blocks 103 may be configurable in a variety of ways to suit differing design needs. For example, embedded memory blocks 102 may offer a number of different width and depth options, and DSP blocks 103 may offer a number of differing widths and internal functionality.

Figure 2:
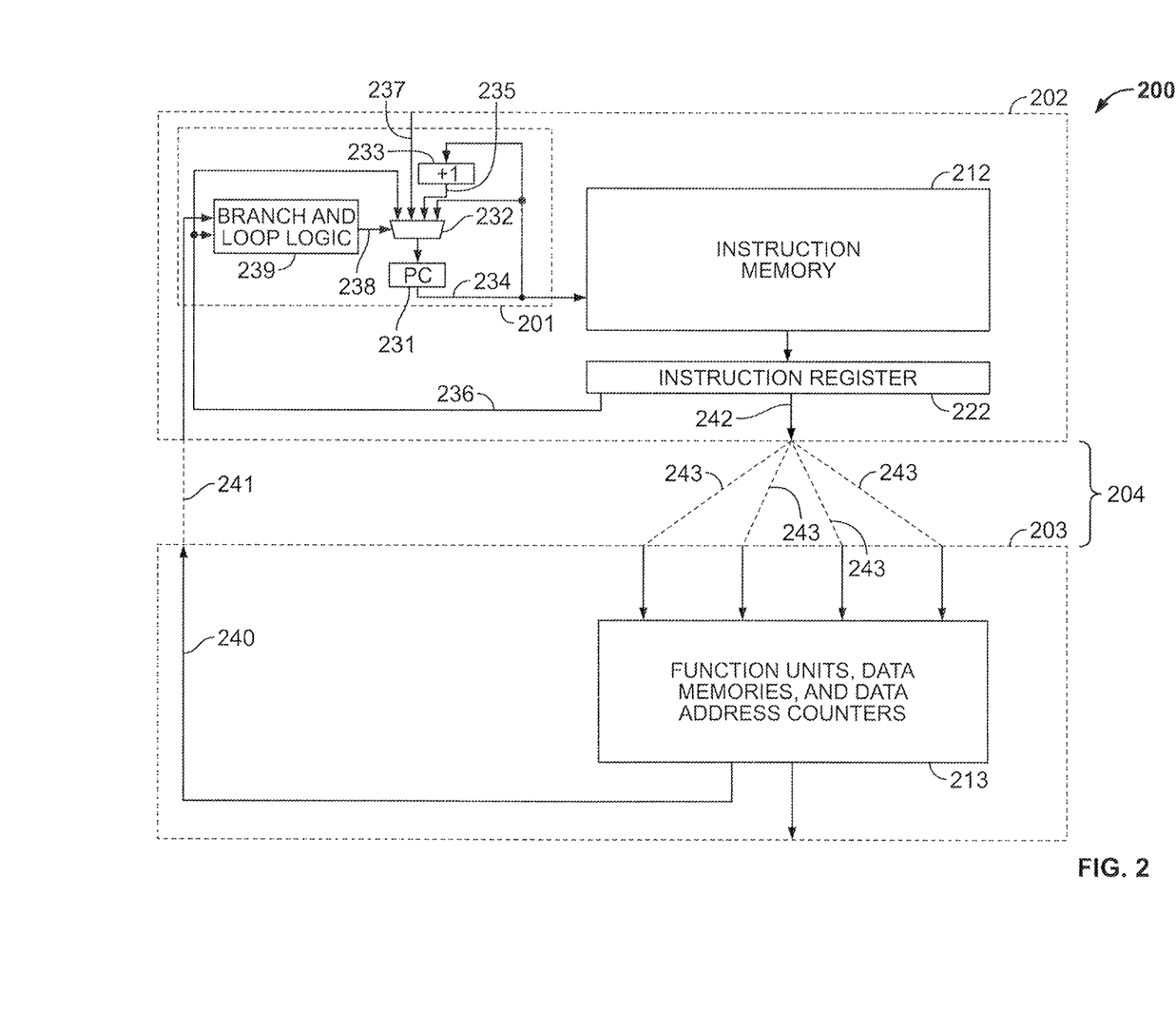
FIG. 2 shows a first possible implementation of modifications allowing the combination of a memory block and a DSP block.

In accordance with embodiments of the present invention, programmable integrated circuit device architecture 100 is modified by adding instruction sequencing units as discussed above. FIG. 2 illustrates one possible implementation 200 of modifications including instruction sequencing unit 201 to realize the combination of an embedded memory block 202 and a DSP block 203 to form a processor. In FIG. 2, instruction sequencing unit 201 is provided within embedded memory block 202, where, when embedded memory block 202 is used as part of a processor, memory elements of embedded memory block 202 operate as instruction memory 212 and an instruction register 222. Similarly, when DSP block 203 is used as part of a processor, the operators and registers 213 of DSP block 203 operate as function units, data memories and data address counters.

Instruction sequencing unit 201 includes a register 231 that acts as a program counter to address instruction memory 212, based on the output of a multiplexer 232. Instruction sequencing unit 201 also includes an increment-by-1 circuit 233 whose input is the output 234 of program counter 231.

Multiplexer 232 selects from among the output 234 of program counter 231, the output 235 of increment-by-1 circuit 233, an output 236 from instruction register 222 providing branch control information and a branch target address or a branch target address offset from the current program counter value, and an input 237 from a neighboring embedded memory block or DSP block (input 237 may supply the address to memory 212 when block 202 is used as memory). The selection is made based on control signal 238 output by branch-and-loop logic 239, whose inputs are output 236 from instruction register 222 and output 240 of operators and registers 213 of DSP block 203. For example, the control information in register output 236 might specify a sequencing mode that is one of "continue" (i.e., execute the next instruction by selecting the program counter value incremented by 1), or a conditional or unconditional branching to a specified address, or a conditional or unconditional branching to an offset plus the current program counter value. In the case of the conditional operation the signals 240 might control whether the condition is satisfied or not. The branch-and-loop logic might also have an internal counter that can be loaded with a value from register output 236, and an sequencing mode might specify that a sequence of instructions is to be executed some number of times, as determined by the value loaded from the instruction register through register output 236. The instruction might also specify a jump to subroutine, which would load a new value into the program counter after saving its present value; or a return from subroutine.

In the implementation 200 in FIG. 2, the connections between embedded memory block 202 and DSP block 203 are made using the general-purpose interconnect 204 of the programmable integrated circuit device. That includes the connection 241 of output 240 to branch-and-loop logic 239, as well as connections 243 of instruction outputs 242 from instruction register 222 to operators and registers 213 of DSP block 203 (when block 202 is used as memory, the output data may be read into register 222 and driven onto general-purpose routing over connections 242).

Figure 3:
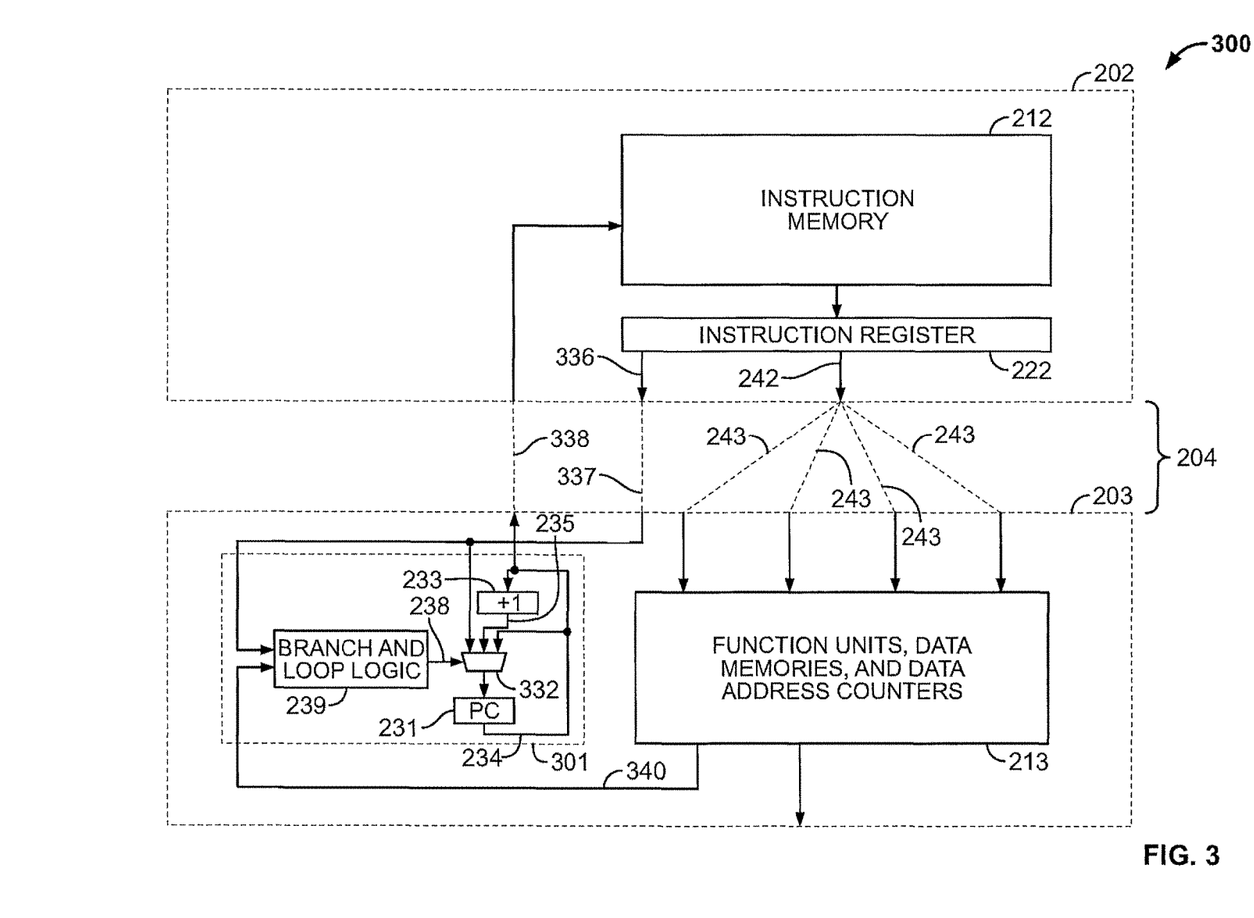
FIG. 3 shows a second possible implementation of modifications allowing the combination of a memory block and a DSP block.

Alternatively, in the implementation 300 of FIG. 3, instruction sequencing unit 301 is located in DSP block 203 rather than in embedded memory block 202. Instruction sequencing unit 301 is very much like instruction sequencing unit 201, except that multiplexer 332 lacks as an input choice the output 237 of another block (because inputs 243 are available). While output 340 of operators and registers 213 of DSP block 203 connects to branch-and-loop logic 239 without having to pass through general-purpose interconnect 204 of the programmable integrated circuit device, output 336 from instruction register 222 would have to pass through connection 337 in general-purpose interconnect 204. In addition, the instruction address from program counter 231 would have to pass through connection 338 in general-purpose interconnect 204. Therefore, implementation 300 may involve greater branch latency than implementation 200, because in implementation 300 a branch address needs to be transmitted over two routing paths 336 and 338, while in implementation 200 the branch address can be transmitted entirely within the embedded memory block 202.

Whether implementation 200 or implementation 300 is used, the use of general-purpose interconnect 204 of the programmable integrated circuit device to communicate between embedded memory block 202 and DSP block 203 may be tolerable when there is only one embedded memory block 202 and one DSP block 203 involved and they are near one another. However, there may be situations when multiple embedded memory blocks 202 or multiple DSP blocks 203 are required to form the desired processor. For example, while an instruction may fit within a single embedded memory block 202, there may be some instructions that are too wide for a single embedded memory block 202, requiring multiple embedded memory blocks 202. As another example, it may be desired to send an instruction or set of instructions from a single embedded memory block 202 (or from multiple embedded memory blocks 202) to multiple DSP blocks 203.

Therefore, according to another aspect of the present invention, a dedicated instruction bus may be provided between embedded memory blocks 202 and DSP blocks 203. The instruction bus is dedicated in the sense that its conductors are not used for any purpose other than to communicate instructions between one or more embedded memory blocks 202 and one or more DSP blocks 203. However, the connection of any particular conductor in the instruction bus to any particular input of a DSP block 203 may be programmably configurable.

As noted above, it may be desired to send an instruction or set of instructions from a single embedded memory block 202 to multiple DSP blocks 203. For example, using a single instruction to control multiple DSPs could save instruction bits. Therefore, in one possible implementation, an instruction bus may be provided that spans multiple DSP blocks 203. Each DSP block 203 along the bus may configurably be controlled by instructions on the instruction bus.

Another function of the instruction bus may be to provide the ability for each respective one of several embedded memory blocks 202 to provide a respective part of an instruction. For example, an embedded memory block 202 may provide a 40-bit-wide output, but DSP block 203 may take a 64-bit-wide instruction input. In such a case, it may be useful to use two embedded memory blocks 202, with one of the embedded memory blocks 202 driving a distinct subset of the 64 bits.

And, as noted above, both functions may be used. That is, multiple embedded memory blocks 202 can be used to provide the same wide instructions to multiple DSP blocks 203.

Figure 4:
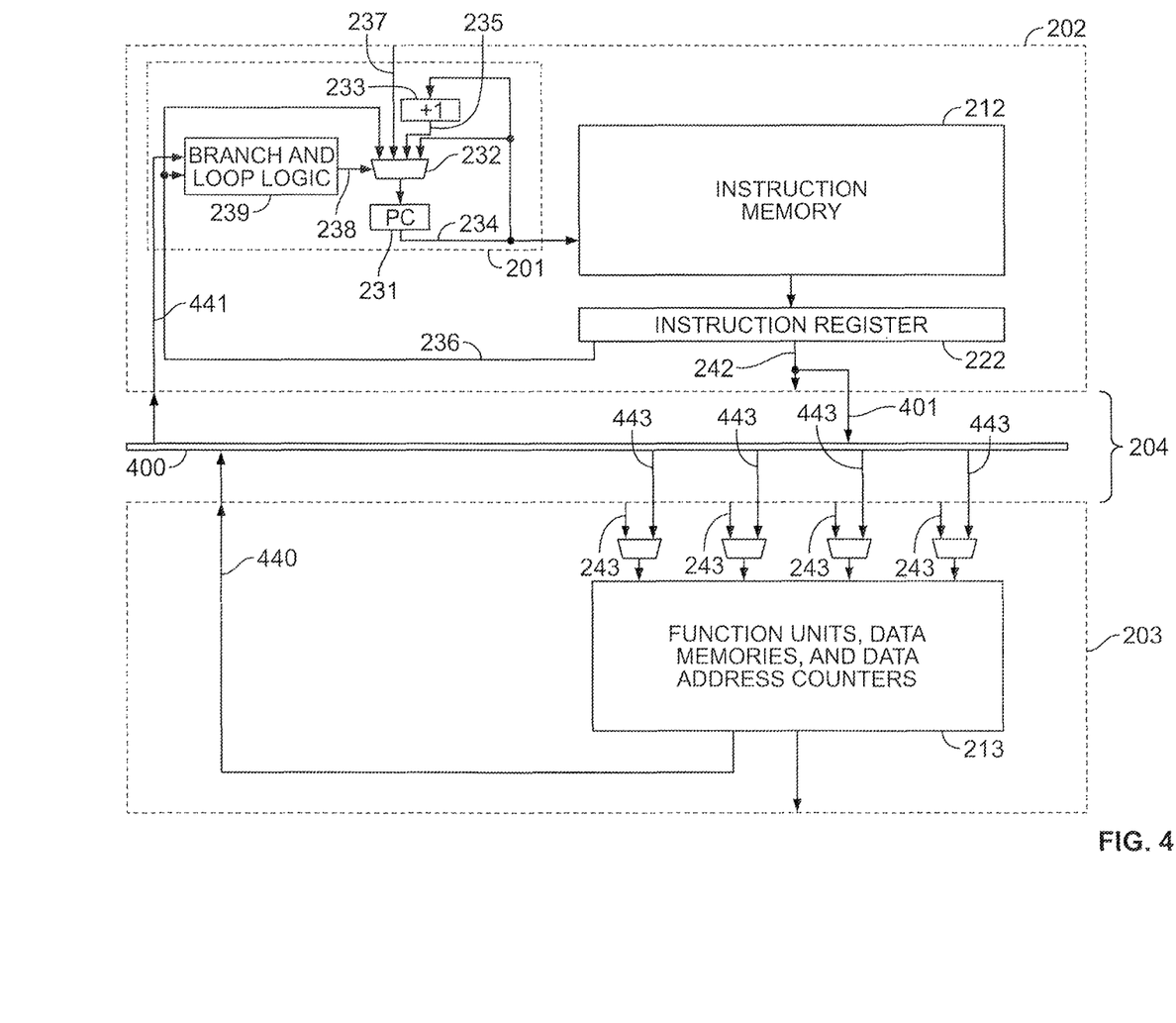
FIG. 4 shows a further possible implementation, similar to FIG. 2, including an instruction bus.

FIG. 4 shows how instruction bus 400 may be used with the implementation of FIG. 2. As seen, there is an extra output connection 401 from instruction register 222 to allow instructions to be conducted onto instruction bus 400. Similarly, inputs 243 from general-purpose interconnect 204 to the operators and registers 213 of DSP block 203 may be multiplexed with inputs 443 from instruction bus 400, providing the aforementioned programmable connections from instruction bus 400.

Instruction bus 400 may be located between embedded memory blocks 202 and DSP blocks 203, along with general-purpose interconnect 204, or may be located within DSP blocks 203. Either way, signals may be driven onto individual conductors within instruction bus 400 from embedded memory blocks 202 or from general-purpose interconnect 204. As in the case of general-purpose interconnect 204, instruction bus 400 may include conductors of various lengths, such as 1, 2 or 4 blocks in length, and may be provided with the ability to be programmably connected to adjacent bus conductor segments. However, it will be appreciated that if instruction bus 400 is located within DSP blocks 203, then the conductor segments would not have lengths greater than 1 block long.

In a further variant, although bus 400 is referred to as an instruction bus, it may also be used in the opposite direction—i.e., from DSP block 203 to embedded memory block 202, such as to convey output 440 of operators and registers 213 of DSP block 203 to input 441 of branch and loop logic 239 of sequencing unit 201 in embedded memory block 202.

Figure 5:
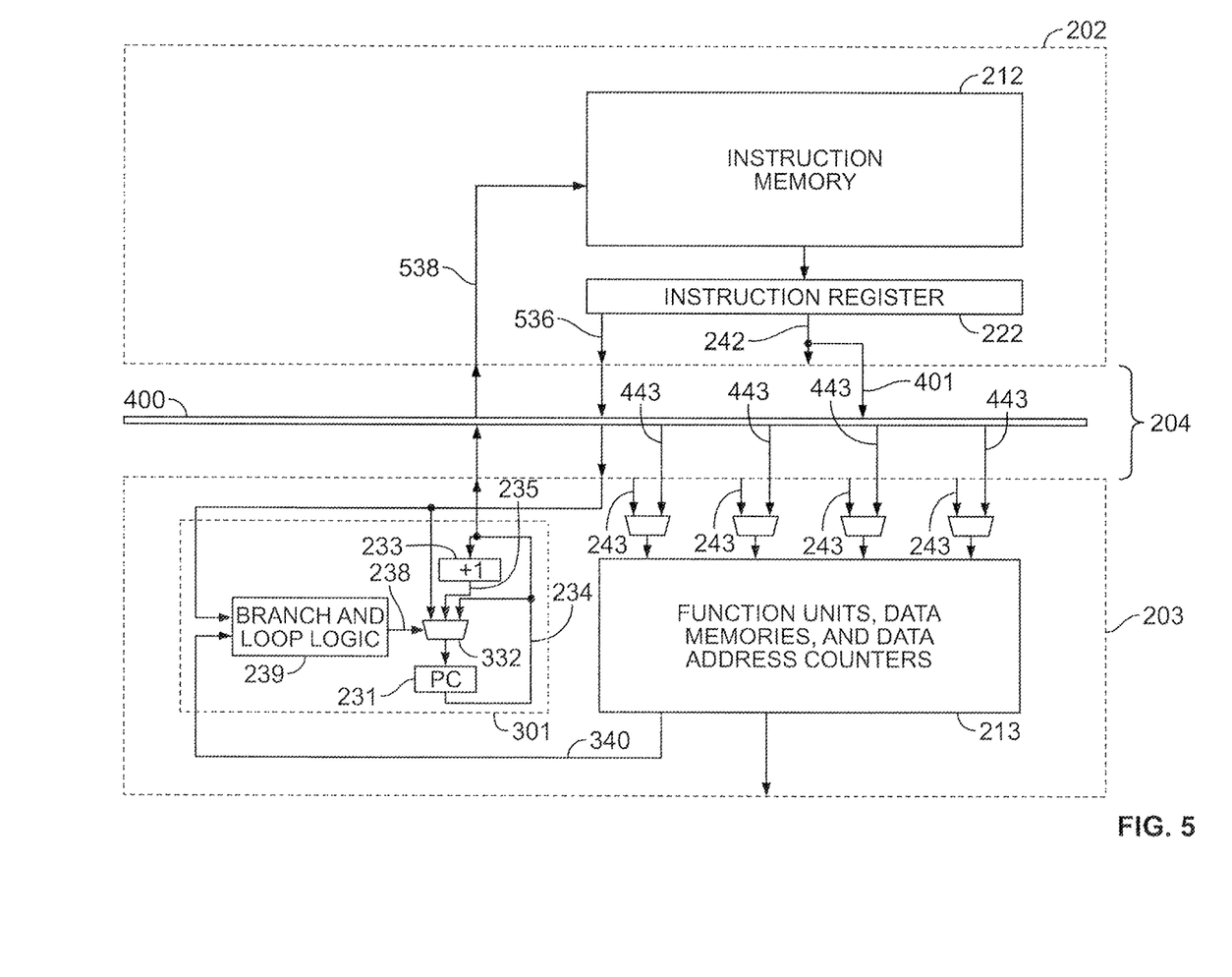
FIG. 5 shows a further possible implementation, similar to FIG. 3, including an instruction bus.

FIG. 5 shows how instruction bus 400 may be used with the implementation of FIG. 3. In addition to connection 401 from instruction register 222 to allow instructions to be conducted onto instruction bus 400, output 536 from instruction register 222, although not strictly an instruction, may be conducted onto instruction bus 400 for communication to sequencing unit 301. As in FIG. 4, inputs 243 from general-purpose interconnect 204 to the operators and registers 213 of DSP block 203 may be multiplexed with inputs 443 from instruction bus 400, providing the aforementioned programmable connections from instruction bus 400. And in a variant as above, although bus 400 is referred to as an instruction bus, it may also be used in the opposite direction—i.e., from DSP block 203 to embedded memory block 202, such as to convey output 234 of of program counter 231 of sequencing unit 301 in DSP block 203 to address input 536 of instruction memory 212 in embedded memory block 202.

Figure 6:
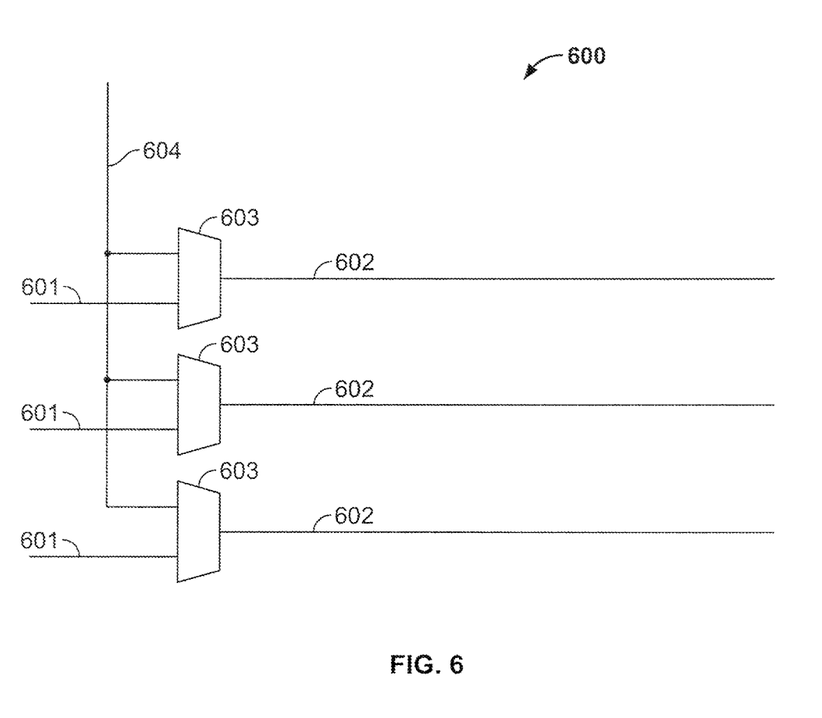
FIG. 6 shows one possible implementation of an instruction bus.

As noted above the instruction bus may include conductor segments that are 1, 2, 3 or any number of blocks long. According to a first alternative bus construction 600, shown in FIG. 6, adjacent instruction bus conductor segments 601, 602 may, for example, be separated by multiplexers 603. Multiplexers 603 can be used to either interconnect adjacent conductor segments 601, 602, or to select an output from one of multiple signals 604 from an embedded memory block 202. In this alternative 600, signals (i.e., instructions) from a particular embedded memory block output 604 can be driven in only one direction on instruction bus 400 (e.g., to the right, in the orientation shown in FIG. 6). Similarly the outputs 440 may be driven onto the instruction bus using the same hardware structure.

Figure 7:
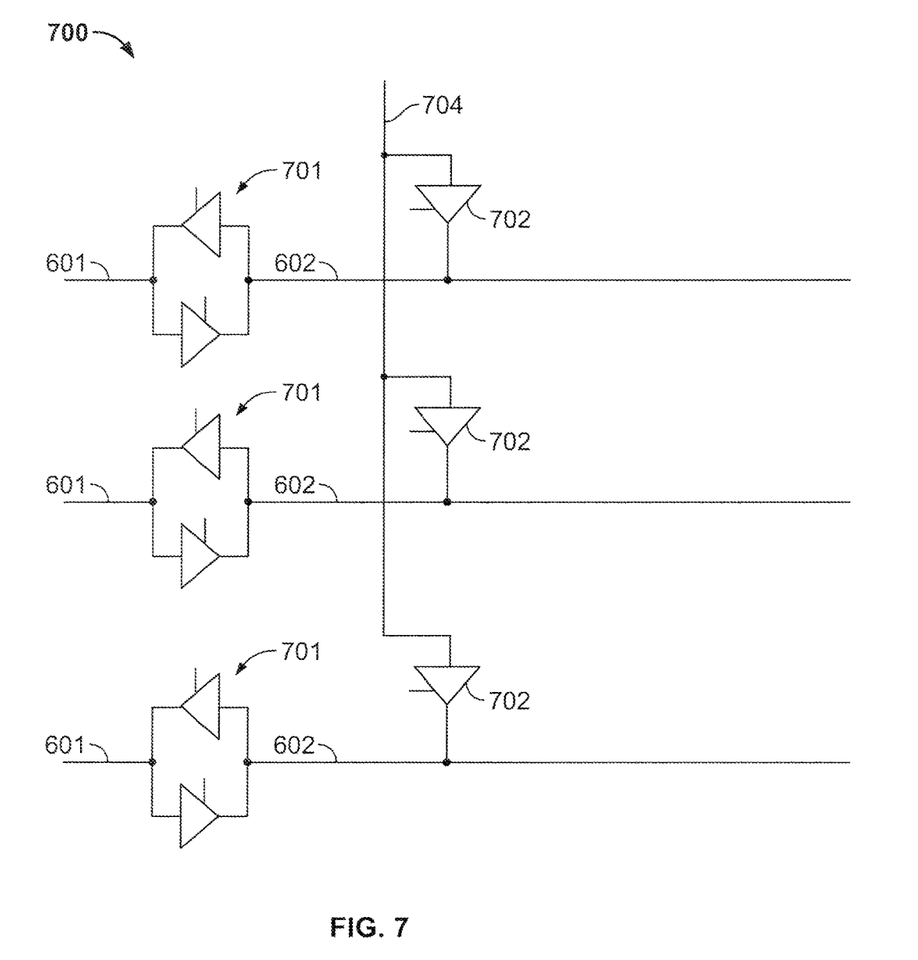
FIG. 7 shows another possible implementation of an instruction bus.

According to a second alternative bus construction 700, shown in FIG. 7, adjacent instruction bus conductor segments 601, 602 may, for example, be separated by repeaters 701, which could be used to interconnect segments 601, 602 either bidirectionally, or in one desired direction, or could be tristated to keep segments 601, 602 separated. In this alternative 700, each one of embedded memory block outputs 704 (only one shown) may be connected to the instruction bus conductor segments by tristate buffers 702.

In either alternative 600, 700, instruction bus 400 may contain the same number of conductors as the width of an instruction word. Alternatively, instruction bus 400 may contain more conductors than the width of an instruction word, to allow flexible placement of instruction memories in embedded memory blocks 202 relative to destination DSP blocks 203, and to allow communications in the opposite direction (i.e., from DSP block 203 to embedded memory block 202) using signals 440, 538 in the variants discussed in connection with FIGS. 4 and 5.

In the foregoing discussion, it has been assumed that DSP block 203 is similar to a known DSP block such as those included in the aforementioned devices from Altera Corporation, except for the possible inclusion of instruction sequencing unit 201, 301—i.e., that operators and registers 213 are similar to those in such devices. However, it may be desirable to provide extra signal paths to accept inputs to DSP block 203 to provide operands directly, as an alternative to providing operands via the memories in DSP block 203. In addition, rather than providing fixed operators such as multipliers and adders, it may be desirable to provide function blocks in the DSP block that can dynamically support multiple functions, with mode control signals that can be provided externally.

Figure 8:
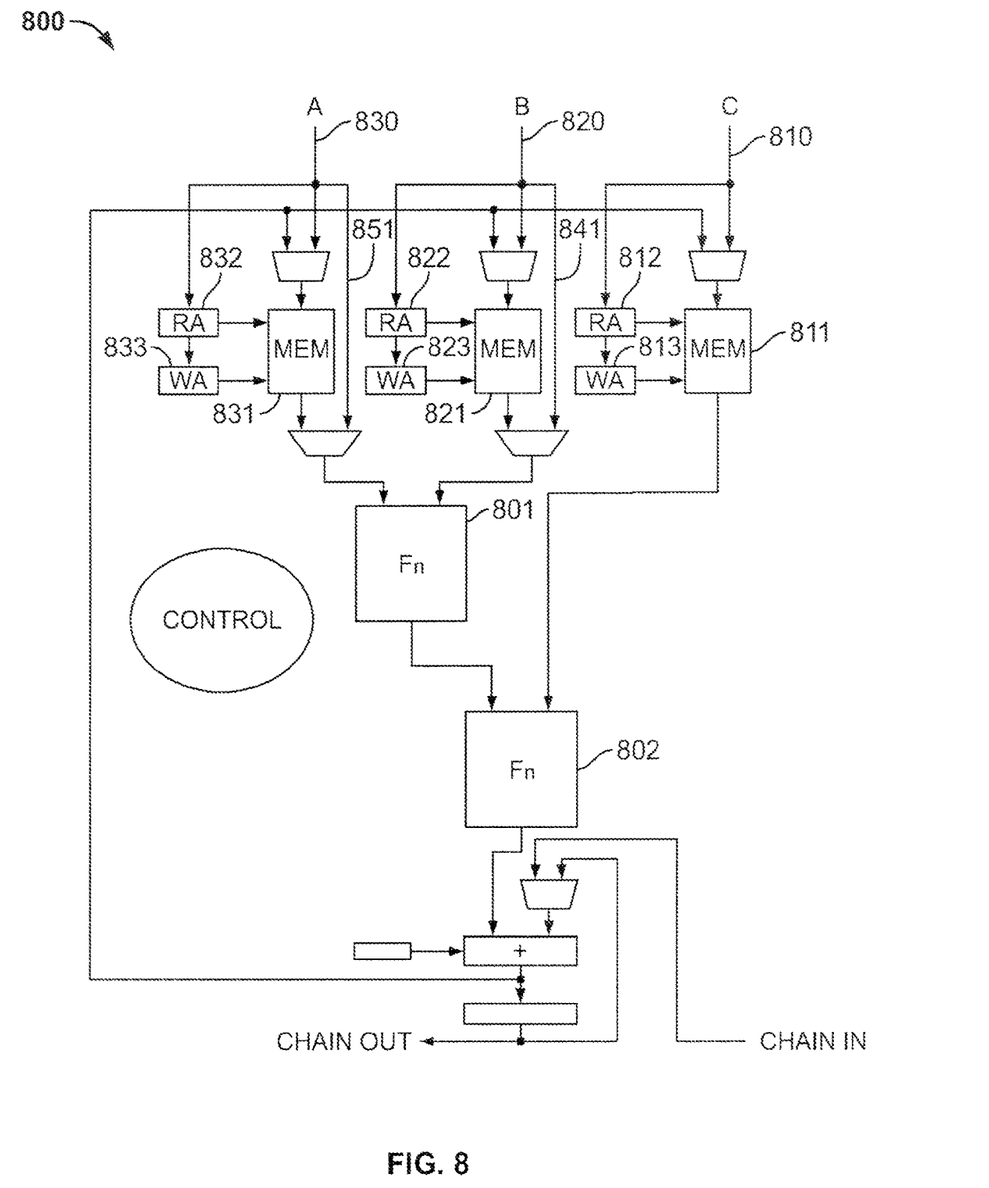
FIG. 8 is a representation of an extended specialized processing block that can be used in the present invention.

An example of such an extended specialized processing block 800 is shown in FIG. 8. Extended specialized processing block 800 includes dynamic function blocks 801, 802. For multiply-accumulate operations, block 801 would be configured as an adder and block 802 would be configured as a multiplier. But other configurations can be used for other operations, particularly if block 800 is being used as part of a processor in accordance with this disclosure. Input 810 is used to input operands via memory 811, and also to input read and/or write addresses 812, 813, for input to operator 802. On the other hand, inputs 820, 830 can be used to input operands via memories 821, 831, and also to input read addresses 822, 832, and/or write addresses 832, 833, or inputs 820, 830 can be used to input operands 841, 851 directly to operator 801.

Thus it is seen that a programmable device structure that is particularly well-suited for the instantiation of processors has been provided.

A PLD 140 incorporating specialized processing blocks (i.e., DSP blocks 203) and embedded memory blocks 202 according to embodiments of the present invention may be used in many kinds of electronic devices. One possible use is in an exemplary data processing system 1400 shown in FIG. 9. Data processing system 1400 may include one or more of the following components: a processor 1401; memory 1102; I/O circuitry 1403; and peripheral devices 1404. These components are coupled together by a system bus 1405 and are populated on a circuit board 1406 which is contained in an end-user system 1407.

Figure 9:
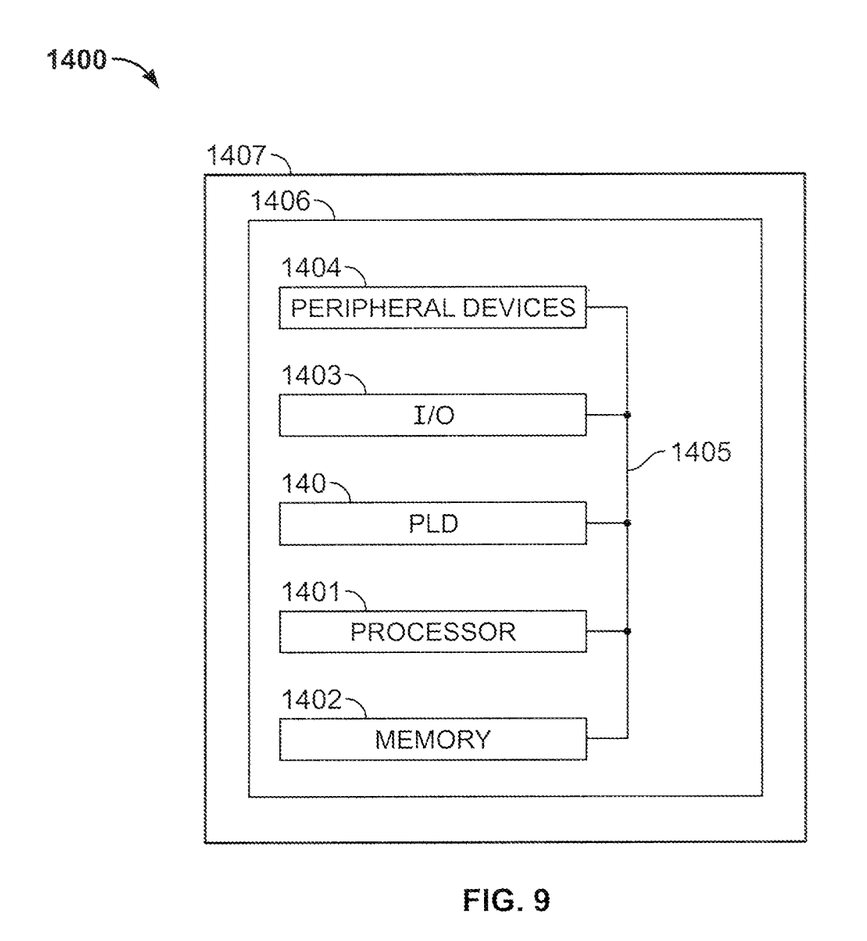
FIG. 9 is a simplified block diagram of an exemplary system employing a programmable logic device incorporating the present invention.

System 1400 can be used in a wide variety of applications, such as computer networking, data networking, instrumentation, video processing, digital signal processing, Remote Radio Head (RRH), or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A programmable integrated circuit device comprising:
   a plurality of clusters of programmable logic resources;
   programmable device interconnect resources enabling interconnection between the plurality of clusters of programmable logic resources;
   a plurality of digital signal processing blocks having arithmetic operators and programmable internal interconnect resources, and having inputs and outputs programmably connectable to the programmable device interconnect resources;
   a plurality of embedded memory modules having inputs and outputs programmably connectable to the programmable device interconnect resources; and
   instruction sequencing circuitry comprising a register configured as a program counter and branch-and-loop logic;
   wherein the instruction sequencing circuitry, at least one digital signal processing block of the plurality of digital signal processing blocks and at least one embedded memory module of the plurality of embedded memory modules are programmably connected to form a processor when the instruction sequencing circuitry is turned on, wherein the at least one digital signal processing block is configured as an arithmetic operator independent from the processor and the at least one embedded memory module is configured as a memory independent from the processor when the instruction sequencing circuitry is turned off.

2. The programmable integrated circuit device of claim 1, wherein the at least one digital signal processing block and the at least one embedded memory module are programmably connectable via the programmable device interconnect resources.

3. The programmable integrated circuit device of claim 2, wherein:
   at least one instance of the instruction sequencing circuitry is located within the at least one digital signal processing block; and
   the at least one instance of the instruction sequencing circuitry receives input from at least one arithmetic operator of the arithmetic operators via the programmable internal interconnect resources and provides output to address inputs of the at least one embedded memory module via the programmable device interconnect resources.

4. The programmable integrated circuit device of claim 2, wherein:
   at least one instance of the instruction sequencing circuitry is located within the at least one embedded memory module; and
   the at least one instance of the instruction sequencing circuitry receives input from at least one arithmetic operator of the arithmetic operators via the programmable device interconnect resources and provides output to address inputs of the at least one embedded memory module.

5. The programmable integrated circuit device of claim 1, further comprising:
   a dedicated instruction bus; wherein:
   outputs of the at least one embedded memory module are programmably connectable to the dedicated instruction bus; and
   inputs of the at least one digital signal processing block are programmably connectable to the dedicated instruction bus.

6. The programmable integrated circuit device of claim 5, wherein:
   at least one instance of the instruction sequencing circuitry is located within the at least one digital signal processing block; and
   the at least one instance of the instruction sequencing circuitry receives input from at least one arithmetic operator of the arithmetic operators via the programmable internal interconnect resources and provides output to address inputs of the at least one embedded memory module via the dedicated instruction bus.

7. The programmable integrated circuit device of claim 5, wherein:
   at least one instance of the instruction sequencing circuitry is located within the at least one embedded memory module; and
   the at least one instance of the instruction sequencing circuitry receives input from at least one arithmetic operator of the arithmetic operators via the dedicated instruction bus and provides output to address inputs of the at least one embedded memory module.

8. The programmable integrated circuit device of claim 5, wherein:
   the dedicated instruction bus extends along the plurality of embedded memory modules and the plurality of digital signal processing blocks;
   the dedicated instruction bus is divided into segments that are controllably connected to one another; and
   at least one segment of the segments is controllably connected to an output of one embedded memory module of the plurality of embedded memory modules.

9. The programmable integrated circuit device of claim 8, wherein:
   an adjacent pair of the segments of the dedicated instruction bus are connected by a multiplexer that controllably selects, as output to a first segment in the pair, a second segment in the pair or an output of one of the plurality of embedded memory modules; whereby:
   the dedicated instruction bus is unidirectional.

10. The programmable integrated device of claim 8, wherein:
    an adjacent pair of the segments of the dedicated instruction bus are connected by a bidirectional repeater; and
    the segments are controllably connected to the output of one of the plurality of embedded memory modules by tristatable buffers; whereby:
    the dedicated instruction bus is bidirectional.

11. The programmable integrated device of claim 5, wherein:
    the instruction sequencing circuitry is in the at least one digital signal processing block;
    inputs of the at least one embedded memory module are programmably connectable to the dedicated instruction bus; and outputs of the at least one digital signal processing block are programmably connectable to the dedicated instruction bus; whereby:

instruction sequence data passes from the instruction sequencing circuitry to the at least one embedded memory module.

12. The programmable integrated circuit device of claim 1, wherein the arithmetic operators are dedicated.

13. The programmable integrated circuit device of claim 1, wherein the arithmetic operators are dynamically configurable.

14. The programmable integrated circuit device of claim 1, wherein the arithmetic operators receive inputs from directly outside the at least one digital signal processing block.

15. A processor instantiated on a programmable integrated circuit device, the processor comprising:

an embedded memory module of the programmable integrated circuit device configured as instruction memory;

a digital signal processing block of the programmable integrated circuit device, having dedicated arithmetic operators and programmable internal interconnect resources, configured as processor functions; and instruction sequencing circuitry of the programmable integrated circuit device comprising a register configured as a program counter and branch-and-loop logic, wherein the instruction sequencing circuitry is programmably connected to the embedded memory module and to the digital signal processing block when the instruction sequencing circuitry is turned on, wherein the embedded memory module is configured as a memory independent from the processor and the digital signal processing block is configured as an arithmetic operator independent from the processor when the instruction sequencing circuitry is turned off.

16. The processor instantiated on the programmable integrated circuit device as in claim 15, wherein the digital signal processing block and the embedded memory module are programmably connectable via the programmable internal interconnect resources.

17. The processor instantiated on the programmable integrated circuit device as in claim 16, wherein:

the instruction sequencing circuitry is located within the digital signal processing block; and the instruction sequencing circuitry receives input from the digital signal processing block via the programmable internal interconnect resources and provides output to address inputs of the embedded memory module via the programmable internal interconnect resources.

18. The processor instantiated on the programmable integrated circuit device as in claim 16, wherein:

the instruction sequencing circuitry is located within the embedded memory module; and the instruction sequencing circuitry receives input from the digital signal processing block via the programmable internal interconnect resources and provides output to address inputs of the embedded memory module.

19. The processor instantiated on the programmable integrated circuit device as in claim 15, further comprising:

a dedicated instruction bus of the programmable integrated circuit device; wherein:

outputs of the embedded memory module are programmably connectable to the dedicated instruction bus; and inputs of the digital signal processing block are programmably connectable to the dedicated instruction bus.

20. The processor instantiated on the programmable integrated circuit device as in claim 19, wherein:

the instruction sequencing circuitry is located within the digital signal processing block; and the instruction sequencing circuitry receives input from at least one dedicated arithmetic operator of the dedicated arithmetic operators via the programmable internal interconnect resources and provides output to address inputs the embedded memory module via the dedicated instruction bus.

21. The processor instantiated on the programmable integrated circuit device of claim 19, wherein:

the instruction sequencing circuitry is located within the embedded memory module; and the instruction sequencing circuitry receives input from the digital signal processing block via the dedicated instruction bus and provides output to address inputs of the embedded memory module.

22. The processor instantiated on the programmable integrated circuit device as in claim 19, wherein:

the programmable integrated circuit device comprises a plurality of embedded memory modules including the embedded memory module and a plurality of digital signal processing blocks including the digital signal processing blocks;

the dedicated instruction bus extends along the plurality of embedded memory modules and the plurality of digital signal processing blocks;

the dedicated instruction bus is divided into segments that are controllably connected to one another; and at least one segment of the segments is controllably connected to an output of one embedded memory module of the plurality of embedded memory modules.

23. The processor instantiated on the programmable integrated device as in claim 22, wherein:

an adjacent pair of the segments are connected by a multiplexer that controllably selects, as output to a first segment in the adjacent pair, a second segment in the adjacent pair or an output of one of the plurality of embedded memory modules; whereby:

the dedicated instruction bus is unidirectional.

24. The processor instantiated on the programmable integrated device as in claim 22, wherein:

an adjacent pair of the segments are connected by a bidirectional repeater; and the segments are controllably connected to outputs of one of the plurality of embedded memory modules by tristatable buffer; whereby:

the dedicated instruction bus is bidirectional.

25. The processor instantiated on the programmable integrated circuit device as in claim 19, wherein:

the instruction sequencing circuitry is in the digital signal processing block;

inputs of the embedded memory module are programmably connectable to the dedicated instruction bus; and outputs of the digital signal processing block are programmably connectable to the dedicated instruction bus; whereby:

instruction sequence data passes from the instruction sequencing circuitry to the embedded memory module.

* * * * *